United States Patent [19]

Cherian et al.

[11] Patent Number: 5,888,568
[45] Date of Patent: Mar. 30, 1999

[54] LIMITATION OF BROWNING

[75] Inventors: George Cherian; Dharam Vir Vadehra, both of New Milford; Elaine Regina Wedral, Sherman, all of Conn.

[73] Assignee: NESTEC S.A., Vevey, Switzerland

[21] Appl. No.: 104,771

[22] Filed: Jun. 25, 1998

[51] Int. Cl.[6] ............................. A23C 3/00; A23C 19/097
[52] U.S. Cl. ............................ 476/262; 426/89; 426/267; 426/321; 426/330.2; 426/334; 426/580; 426/582; 426/656; 426/658; 426/442
[58] Field of Search ................................ 426/89, 96, 262, 426/267, 321, 330, 330.2, 334, 580, 582, 587, 588, 656, 658, 442

[56] References Cited

U.S. PATENT DOCUMENTS

| | | | |
|---|---|---|---|
| 2,893,878 | 7/1959 | Simon et al. | 426/267 |
| 4,144,357 | 3/1979 | Mohammed | 426/331 X |
| 4,547,386 | 10/1985 | Chambers et al. | 426/583 |

FOREIGN PATENT DOCUMENTS

| | | |
|---|---|---|
| 76371 | 8/1997 | Hungary . |
| 62-132831 | 6/1987 | Japan . |
| 02291226 | 5/1989 | Japan . |
| 93/19628 | 10/1993 | WIPO . |
| WO 9723138 | 8/1997 | WIPO . |

OTHER PUBLICATIONS

Bley et al., "Factors Affecting Nonenzymatic Browning of Process Cheese", Journal of Dairy Science, vol. 68 (3), pp. 555–561, 1985.

*Primary Examiner*—Milton Cano
*Attorney, Agent, or Firm*—Pennie & Edmonds LLP

[57] ABSTRACT

A process for limiting the non-enzymatic Maillard browning in food products susceptible to nonenzymatic Maillard browning which comprises coating the ingredient of the food product containing either an amino-bearing compound or a reducing sugar with a hydrocolloid gel selected from the group consisting of alginates and gellans and then mixing all the ingredients together to form the food product.

9 Claims, No Drawings

LIMITATION OF BROWNING

FIELD OF THE INVENTION

The present invention relates to a process for the limitation of browning in food products and more particularly in food products susceptible to nonenzymatic Maillard browning.

BACKGROUND OF THE INVENTION

Many food products are susceptible to deteriorative reactions caused by the interaction of two or more substrates which trigger the formation of other components followed by a cascade of compounds being formed. A clear example of this is in the case of nonenzymatic Maillard browning which is widespread in foods, e.g. cheese and milk products. The minimum reactants required for non-enzymatic Maillard browning are the presence of an amino bearing compound, usually a protein, a reducing sugar and some water. Importance lies in the fact that not only does non-enzymatic Maillard browning involve changes in color and flavor, but it also involves loss of essential amino acid such as lysine. It has also been reported that some of the products formed have mutagenicity. Thus, it is apparent that in many cases it is important to limit the Maillard browning to improve product quality.

SUMMARY OF THE INVENTION

We have devised a process whereby it is possible to inhibit and/or slow down reaction rates by keeping the substrates from interacting with each other. This involves the use of certain gel systems to coat the ingredient of the food product containing either the amino-bearing compound or the reducing sugar thus keeping the reactants apart and minimizing the deteriorative reaction.

Accordingly, the present invention provides a process for limiting the non-enzymatic Maillard browning in food products susceptible to nonenzymatic Maillard browning which comprises coating the ingredient of the food product containing either the amino-bearing compound or the reducing sugar with a hydrocolloid gel selected from the group consisting of alginates and gellans and then mixing all the ingredients together to form the food product.

If desired, each of the ingredients containing the amino-bearing compound and the reducing sugar can be separately coated before mixing all together.

DETAILED DESCRIPTION OF THE INVENTION

The present invention is particularly applicable wherein the food product is a cheese, milk, or dairy based product, e.g. sauces such as Parmesan, Four cheese, Cheddar, Bechamel sauce, Mornay sauce, White wine sauce, Alfredo sauce, chicken veloute sauce, Carbonarra, etc.

The amino-bearing compound is usually a protein but may be a peptone or polypeptide. The reducing sugar may be a monosaccharide such as invert sugar, dextrose or fructose, or a disaccharide such as lactose or maltose.

The gel may be formed from the hydrocolloid by applying conditions ideal to its formation.

For example, alginates may be gelled by treating with a solution of a calcium salt such as a $CaCl_2$ solution or with an acid. The gel is formed immediately when $Ca^{+2}$ ions are introduced. The alginate gels may usually be formed at a pH of 4.0 and above and optimally at pH from 6 to 8.

Gellan may be gelled by adding to water and heating to temperatures of from 75° to 85° C. in the presence of ions such as calcium, potassium, sodium or magnesium, e.g. $CaCl_2$, advantageously with cooling to help in setting the gel. The pH is preferably from 5.5 to 8.5.

The gel forms a coating on the surface of the ingredient and, after coating the gel on at least one of the ingredients, all the ingredients of the food product are mixed together.

The amount of gelling agent used may be from 0.05 to 15%, preferably from 0.25 to 6% by weight based on the weight of the ingredient which is to be coated.

The alginate may be alginic acid (polymannuronic acid) or an alkaline or alkaline earth salt thereof, e.g. sodium alginate or potassium alginate.

Gellan is an extracellular polysaccharide gum produced by the aerobic fermentation of *Pseudomonas elodea* on a carbohydrate substrate, e.g. glucose, plus a nitrogen source and inorganic salts. The broth is then treated with hot alkali following which the gum is precipitated with propan-2-ol. The gum is composed of rhamnose, glucose and glucuronic acid in the ratio of about 1:2:1.

EXAMPLES

The following Examples further illustrate the present invention.

Example 1

A model system of cheese (Romano and Parmesan) and lactose was used to study the effect of gelling agents on limiting browning reactions. Different gelling agents (gelatine, algin, xanthan, curdlan, gellan) were investigated to keep the substrates from interaction. The formulations are shown in Table 1.

Sample A is a control sample without gelling agent where the cheeses, lactose and water were mixed together using a Polytron mixer for three minutes.

Samples B, E and G using algin and gellan within the scope of the present invention were prepared by first dry mixing the reducing sugar (lactose) with the algin or the gellan, then adding an aqueous solution of calcium chloride gradually to the dry mix under high shear to ensure a homogenous distribution and the lactose became coated with the gel. The cheeses were then blended in with a Polytron mixer at room temperature for three minutes.

Samples C, D and F using gelatin, curdlan and xanthan, outside the scope of the present invention, were prepared by first dry mixing the reducing sugar (lactose) with the gelatin, curdlan or xanthan, adding water slowly under high shear until the lactose became coated with the gel and then slurrying in the cheeses and mixing for three minutes in a Polytron mixer.

All the samples were packed in aluminum pouches and sealed. The pouches were then pasteurized at 80° C. for 30 min. The product was cooled and then stored at 45° C. for 3 weeks. The product water activity and color were measured using a Hunterlab ColorQuest calorimeter where the "L" parameter is a measure of the lightness on a scale of 0 to 100 with 0 being black and 100 being pure white.. The parameters "a" (+a [positive value] represents redness and –a [negative value] represents green) and "b" (+b represents yellow and –b represents blue) is also a useful indicator of the color. The ratio of b/a can be used as an indicator of darkening, a lower value indicating a darker color.

The results are shown in Table II. As seen from the results, Samples B and G, containing the alginate systems gave the least browning followed by Sample E containing the gellan system while the Control Sample A and Samples C, D and F containing the remaining gelling agents outside the scope of the present invention did not perform effectively.

TABLE I

|  | Amount (g) |
| --- | --- |
| Sample A |  |
| Romano | 25 |
| Parmesan | 25 |
| Water | 50 |
| Lactose | 50 |
| Sample B |  |
| Romano | 25 |
| Parmesan | 25 |
| Keltone HV (algin) | 0.5 |
| CaCl2 | 2.5 |
| lactose | 50 |
| Water | 50 |
| Sample C |  |
| Romano | 25 |
| Parmesan | 25 |
| Gelatine 300 mesh | 2 |
| Lactose | 50 |
| Water | 50 |
| Sample D |  |
| Romano | 25 |
| Parmesan | 25 |
| Curdlan | 2 |
| Lactose | 50 |
| Water | 50 |
| Sample E |  |
| Romano | 25 |
| Parmesan | 25 |
| Kelcogel F (gellan) | 1.5 |
| Lactose | 50 |
| Water | 50 |
| CaCl2 | 1.5 |
| Sample F |  |
| Romano | 25 |
| Parmesan | 25 |
| Xanthan (Keltrol F) | 1.5 |
| Lactose | 50 |
| Water | 50 |
| Sample G |  |
| Romano | 25 |
| Parmesan | 25 |
| Lactose | 50 |
| Water | 50 |
| Keltone HV (algin) | 1.5 |
| CaCl2 | 1.5 |

TABLE II

| Sample | Aw | L | a | b |
| --- | --- | --- | --- | --- |
| A | 0.93 | 59.91 | 11.58 | 39.01 |
| B | 0.93 | 74.06 | 3.02 | 28.64 |
| C | 0.93 | 61.8 | 9.33 | 37.08 |
| D | 0.91 | 49.83 | 17.11 | 41.7 |
| E | 0.93 | 69.18 | 7.08 | 33.09 |
| F | 0.92 | 54.43 | 15.56 | 44.3 |
| G | 0.93 | 70.33 | 4.82 | 29.49 |

Example 2

A cheese sauce comprising 27% by weight Gorgonzola, Grana Padona, Cacioreale and Patorella cheeses together with 9% by weight sweet whey powder was used to study the effect of alginate at 0.5% and 1.0% by weight on limiting browning reactions when compared to a control without gelling agent.

The process for the control (without the gelling agent) involved stepwise mixing of the ingredients and then heat processing. For the samples with alginate addition, the process involved was identical to the control. The only difference was that ingredients having the reducing sugars was coated with the gelling system. In this example, this involved dry mixing the sweet whey powder, cream powder and Keltone HV. The dry mix is blended with the sour cream, heavy cream and then the $CaCl_2$ is slowly added to coat it. The rest of the ingredients are then added and heat processed. The product was then pouched in aluminum pouches and then stored. The other approach of coating the cheeses with the gel would also be effective. The samples were stored frozen and at 35° C. The results for 2 month old color measured by Hunter colormeter and absorbance at 420 nm (at two weeks) are shown below in Tables III. The control formulation exhibited a color intensity of about 0.06 whereas 0.5% and 1% alginate formulations exhibited a color intensity on the order of about 0.04.

TABLE III

|  | Frozen | Control (35° C.) | Alginate (@0.5% level) 35° C. | Alginate (@1% level) 35° C. |
| --- | --- | --- | --- | --- |
| L | 73.94 | 60.79 | 65.78 | 68.27 |
| a | 0.2 | 6.67 | 5.04 | 4.08 |
| b | 19.35 | 22.71 | 22.09 | 21.67 |

After storage at 35° C. for 2 months, the reducing system treated with alginate was effective at reducing browning significantly compared to a control not using a gelling agent.

Example 3

A similar process to that described in Example 2 was carried out but in which, instead of the reducing system being treated with alginate, the cheeses were treated with alginate. After storage at 35° C. for 2 months, the system was found to be effective at reducing browning significantly compared to a control not using a gelling agent.

We claim:

1. A process for limiting the non-enzymatic Maillard browning in food products susceptible to nonenzymatic Maillard browning which comprises coating the ingredient of the food product containing either an amino-bearing compound or a reducing sugar with a hydrocolloid gel selected from the group consisting of alginates and gellans and then mixing all the ingredients together to form the food product.

2. A process according to claim 1 wherein the food product is a cheese, milk or dairy-based product.

3. A process according to claim 1 wherein the amino-bearing compound is a protein.

4. A process according to claim 1 wherein the reducing sugar is a monosaccharide or a disaccharide.

5. A process according to claim 1 wherein the reducing sugar is invert sugar, dextrose, fructose, lactose or maltose.

6. A process according to claim 1 wherein the alginate is gelled by treating with a solution of a calcium salt or with an acid.

7. A process according to claim 1 wherein the gellan is gelled by adding to water and heating to a temperature of from 75° to 85° C. in the presence of ions.

8. A process according to claim 1 wherein the amount of gelling agent used is from 0.1% to 15% by weight based on the weight of the substrate which is gelled.

9. A process according to claim 1 wherein the alginate is alginic acid or an alkaline or alkaline earth salt thereof.

* * * * *